(12) United States Patent
Kahle

(10) Patent No.: US 7,614,311 B2
(45) Date of Patent: Nov. 10, 2009

(54) DEVICE FOR MEASUREMENT OF A MATERIAL MASS FLOW INCLUDING A FLOW MEASURING DEVICE

(75) Inventor: Jens Kahle, Dreieich (DE)

(73) Assignee: Schenck Process GmbH, Darmstadt (DE)

( * ) Notice: Subject to any disclaimer, the term of this patent is extended or adjusted under 35 U.S.C. 154(b) by 195 days.

(21) Appl. No.: 11/792,913

(22) PCT Filed: Dec. 13, 2005

(86) PCT No.: PCT/EP2005/013324

§ 371 (c)(1),
(2), (4) Date: Jun. 13, 2007

(87) PCT Pub. No.: WO2006/063774

PCT Pub. Date: Jun. 22, 2006

(65) Prior Publication Data

US 2008/0210018 A1 Sep. 4, 2008

(30) Foreign Application Priority Data

Dec. 14, 2004 (DE) .................... 10 2004 060 045

(51) Int. Cl.
*G01F 1/82* (2006.01)
(52) U.S. Cl. .................................... 73/861.353
(58) Field of Classification Search ............ None
See application file for complete search history.

(56) References Cited

U.S. PATENT DOCUMENTS

| | | | |
|---|---|---|---|
| 2,168,038 A * | 8/1939 | Moore | 346/123 |
| 2,724,969 A * | 11/1955 | Bloser | 73/861.76 |
| 3,350,936 A | 11/1967 | Li | |
| 4,574,896 A | 3/1986 | Friedrich | |
| 4,700,578 A | 10/1987 | Fassbinder | |
| 5,191,802 A | 3/1993 | Fassbinder | |
| 6,705,171 B1 * | 3/2004 | Toerner | 73/861.354 |
| 7,168,328 B2 * | 1/2007 | Kahle | 73/861.353 |
| 2008/0223624 A1 * | 9/2008 | Hax | 177/16 |

FOREIGN PATENT DOCUMENTS

| | | |
|---|---|---|
| DE | 3346145 C2 | 7/1985 |
| DE | 3507993 C2 | 9/1986 |
| DE | 19905991 A1 | 8/2000 |
| DE | 0474121 B1 | 3/2002 |
| DE | 10253078 B3 | 4/2004 |
| WO | WO 2004/044533 * | 5/2004 |

* cited by examiner

*Primary Examiner*—Harshad Patel
(74) *Attorney, Agent, or Firm*—Jacobson Holman PLLC

(57) ABSTRACT

A device for the measurement of the mass flow, in particular, of a bulk material flow, by the Coriolis measuring principle, comprising a motor with an impeller, driven at constant speed. The bulk material flow is dispensed onto the impeller, radially deflected and measured by means of a force measurement device for the drive torque of the impeller. A drive shaft supporting the impeller is rotatably mounted in a bearing sleeve and is coaxially enclosed by the same. The bearing sleeve is driven at a speed which corresponds to the speed of the drive shaft. The force measurement device is arranged directly between the drive shaft and the bearing sleeve.

16 Claims, 1 Drawing Sheet

DEVICE FOR MEASUREMENT OF A MATERIAL MASS FLOW INCLUDING A FLOW MEASURING DEVICE

Figure 1:
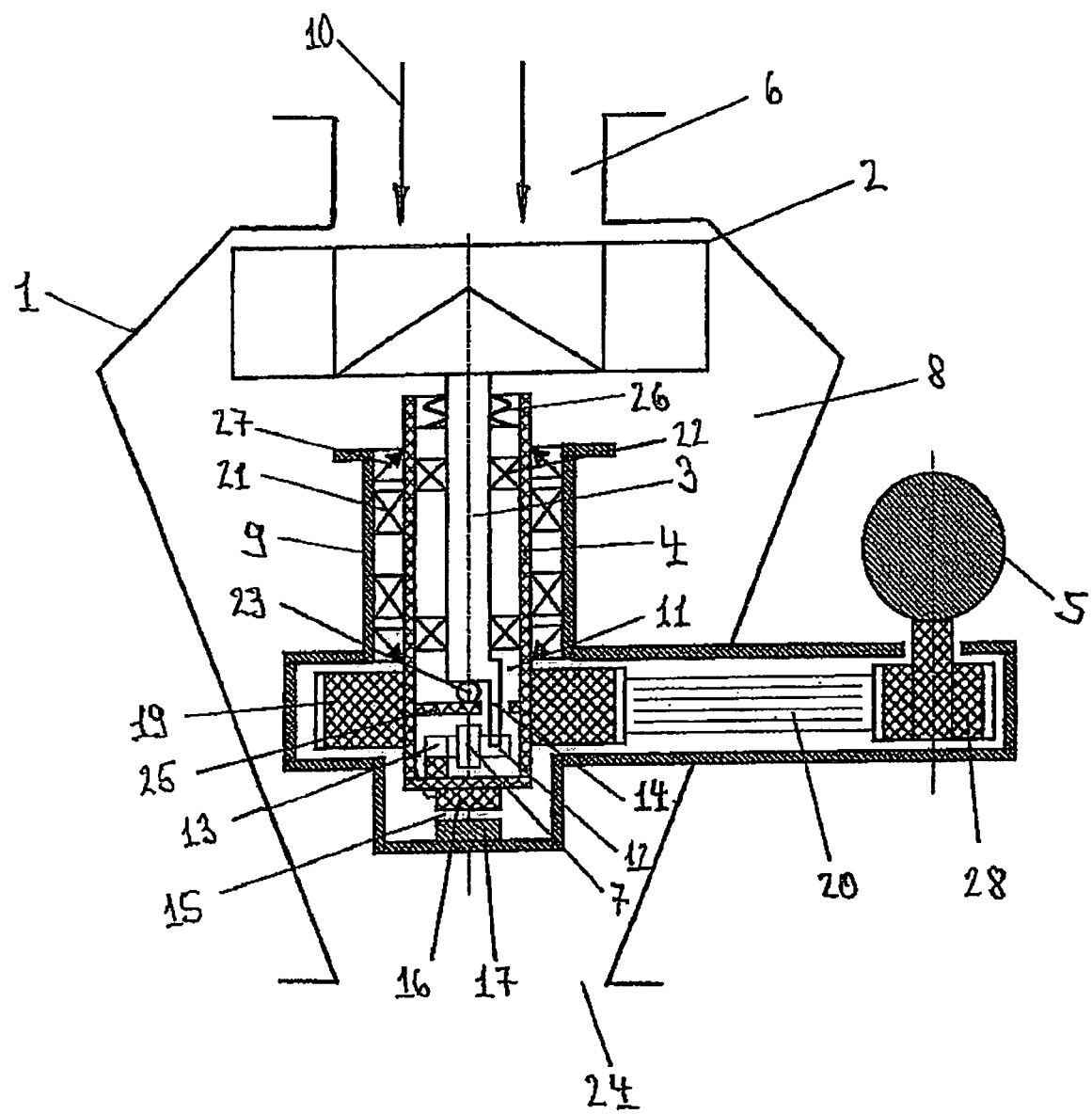

This is a national stage of PCT/EP05/013324 filed Dec. 13, 2005 and published in German.

The invention relates to a device for measuring the mass flow, in particular, for measuring a bulk material flow through a flow measuring device.

In practice, conveyor belt scales, measuring chutes, impact plates or measuring devices based on the Coriolis principle are used predominantly for continuously determining the flow rate of mass flows, preferably bulk material flows. Preferably mass flow-rate measuring devices operating in accordance with the Coriolis principle are used particularly for the high-precision measurement of bulk materials, such as granules, well flowing powders, grains and the like. These mass flow-rate measuring devices use the Coriolis force for determining the feed advance rate which force occurs while transporting bulk material particles through a rotating impeller wheel. Here, the impeller wheel comprises guide blades arranged in a star-shaped manner through which the bulk material is accelerated outwardly. The impeller wheel rotates at a constant angular speed. The Coriolis acceleration, which occurs when the bulk material particles are moving, imposes a torque on the measuring wheel which torque is proportional to the mass flow rate. Thus, this measuring method is suitable to detect bulk material flows with high precision because, unlike impact plate systems and measuring chute systems, there is no physical value which is influenced by the characteristics of the bulk material and which enters into the sensitivity of the device. However, one drawback of the Coriolis measuring devices is that the Coriolis forces produced by the mass flow are very small relative to the radial acceleration forces and the disturbing forces resulting therefrom.

As a result, the precision depends very much on the decoupling of the disturbing forces and frictional forces from the measuring train.

A known measuring device for determining the mass flow rate of bulk materials in accordance with the Coriolis principle is known from German Patent publication DE 33 46 145 C2. This measuring device comprises an impeller wheel with radially disposed guide blades, which are arranged on a horizontal plate. The impeller wheel is connected to a drive shaft, which is driven by a motor at constant speed. The motor is rotatably mounted by two ball bearings and is supported on a force transducer, which detects the drive torque. In principle, the drive torque is proportional to the mass flow and can be displayed in an evaluating unit as the feed advance rate or as feeding quantity. However, in this rotatably arranged measuring train comprising the force-measuring device, the rotatably mounted drive motor and the driven impeller wheel, there occur in the ball bearings, frictional forces which are included in the measured value and thus may lead to measurement inaccuracies particularly when the friction values are changing. The high axial forces to be absorbed in the measurement bearing additionally increase the friction in the bearings.

Another mass flow rate measuring device operating in accordance with the Coriolis principle is known from the European Patent publication EP 0 474 121 B1. This device comprises a measuring gear in the drive train for reducing the friction forces. For this purpose, the drive shaft of the impeller wheel is guided to the measuring gear housing through a stationary sleeve. A spur gear wheel is secured to the drive shaft in the measuring gear housing. The spur gear wheel meshes with an intermediate spur gear wheel and with a driving spur gear wheel, which is secured to the drive shaft of the motor. The intermediate spur gear wheel is suspended in a tangentially movable manner and connected to a force-measuring device, which detects the tangential forces, which are proportional to the mass flow rate. In order to avoid friction forces in the measuring train, the drive shaft is secured below the spur gear wheel in an anti-friction bearing. The inner ring of the anti-friction bearing is connected to the drive shaft and the outer ring of the anti-friction bearing is connected to the inner ring of a second anti-friction bearing. The outer ring of the first anti-friction bearing is separately driven by additional spur gear wheels, wherein a drive speed is suggested which corresponds at least to the drive speed of the drive shaft. As a result, only the friction force of the first anti-friction bearing in the measuring train is compensated, wherein the drive shaft rotating at high speed in the sleeve is likely to cause additional bearing frictions. In practice, this bearing friction in the sleeve to the bulk material housing section is kept small by air bearings as disclosed in German Patent publication DE 35 07 993 C2. However, such air bearings require very high production costs and a separate compressed air connection. However, frictional influences are not excluded even in connection with such air bearings, particularly if unilateral radial accelerations occur due to strongly fluctuating mass flow changes or due to non-uniform loading of the impeller wheel. Such unilateral radial accelerations impose an imbalance on the impeller wheel, wherein the drive shaft may contact the bearing sleeve. Furthermore, pressure fluctuations in the bulk material container may lead to the penetration of the bearing area by strongly abrasive bulk material dust, wherein friction changes may occur in the measuring path.

DE 102 53 078 B3 discloses a Coriolis measuring device for detecting bulk material flows, which measuring device comprises an impeller wheel, which is connected to a drive shaft and is driven at constant speed by an electric motor. The impeller wheel deflects an axially impinged mass flow in the radial direction and imparts a radial and tangential speed component to it. The drive shaft is surrounded by a bearing sleeve in which the drive shaft is mounted rotatably. The bearing sleeve protrudes into the housing space of the impeller wheel and is driven by a separate spur gear wheel at a speed corresponding to that of the drive shaft. The bearing sleeve is mounted rotatably in a stationary drive housing part so that basically no relative speed occurs between the drive shaft and the bearing sleeve. The drive shaft and the bearing sleeve end on the drive side in a closed stationary gear housing part, wherein the drive shaft is connected to a spur gear wheel, which meshes with an intermediate spur gear wheel and which is driven by a driving spur gear wheel. The intermediate spur gear wheel is supported on a force-transmitting arm, which is held by a force-measuring device in its radial position. However, since the intermediate spur gear wheel is mounted rotatably in ball bearings on the force-transmitting arm in the drive train, and the force-transmitting arm is mounted rotatably by means of another ball bearing on the gear housing part, bearing points occur in the measuring branch which are subject to friction and can lead to measurement errors. Since these friction values are particularly temperature-dependent, such influences cannot be always compensated for completely by means of calibration measures. It is therefore the object of the invention to improve the measuring accuracy of a mass flow-measuring device according to the Coriolis principle by using the simplest mechanical design.

The advantage of the invention is that by means of the arrangement of the force-measuring device between the drive shaft supporting the impeller wheel and the rotating bearing sleeve, the drive torque for determining the Coriolis force can take place in an almost frictionless manner since the drive shaft basically does not rotate in the bearing sleeve. As a result, measurement errors involving friction cannot occur to a large extent. It is thus simultaneously possible to dispense with an expensive measuring gear, which was necessary heretofore for an independent drive both of the bearing sleeve as well as of the drive shaft. Simultaneously, the measuring bearing is impinged upon advantageously with only small axial forces, and this impingement in turn has friction-reducing effects.

Another advantage of the invention is that due to the direct arrangement of the force-measuring device in the interior zone of the bearing sleeve, the former is mounted in a space-saving manner, due to which particularly the overall height could be reduced considerably. Due to the detection of the drive torque between the bearing sleeve and the drive shaft, it is also advantageously possible to install rotationally symmetric torque sensors, which compensated for imbalance effects or transverse deflections even in multi-phase, non-uniform bulk material flows. Furthermore, the transfer of axial or radial disturbing forces onto the torque sensor is also prevented in a corresponding arrangement of the bearing. The integration of the force-measuring device in the bearing sleeve and the omission of the large-volume measuring gear also enable a relatively narrow drive housing part, along which the radially deflected mass flow can flow past laterally. As a result, the entrance openings and discharge openings could be advantageously arranged axially on top of one another, thereby facilitating the installation in a necessary feed pipe system.

Due to the laterally parallel arrangement of the drive motor in a special embodiment of the invention, only a relatively small overall height is required particularly in the case of a measuring device for large feed advance rates. As a result, the device can also be retrofitted in existing pipe systems having short straight overall lengths or spaces having small overall heights are also sufficient.

The advantage of a special embodiment of the invention in which the measurement signal is transferred using a telemetric device is that conventional slip ring connections afflicted with interference could be replaced by a simple wireless signal transmission even in the case of rotating bearing sleeves. Here the advantage, particularly of an inductive coupling, is that it is thus possible to simultaneously transmit even the feed energy to the force transducers or torque sensors that are equipped with strain gauges.

The invention will now be explained in more detail with reference to an exemplary embodiment, which is shown in the drawing.

The drawing schematically shows the sectional view of a measuring device for detecting bulk material flows in accordance with the Coriolis principle, which device substantially comprises a housing part 1 in which an impeller wheel 2 rotates and a driving and measuring device disposed therebelow. The drive shaft 3 of the impeller wheel protrudes through a driven bearing sleeve 4 into the impeller wheel housing part 1. The bearing sleeve 4 is mounted rotatably in a stationary drive housing part 9, wherein a force-measuring device 7 is disposed inside the bearing sleeve 4 between the latter and the drive shaft 3.

During a measuring operation the bulk material flow 10 is axially admitted as a mass flow to the impeller wheel 2 through an entrance opening 6. The impeller wheel 2 comprises a horizontally disposed disc having radial guide blades and deflects the axially impinging bulk material 10 radially outwardly. The impeller wheel 2 rotates at a constant speed and accelerates the bulk material flow 10 radially outwardly as a result of which, due to the Coriolis force, a braking torque is generated which is proportional to the mass flow 10. For achieving a dustproof measuring operation, the impeller wheel 2 is accommodated in an enclosed housing part 1, which has in its lower portion a discharge opening 24 through which the measured bulk material 10 can be fed to a subsequent process.

The impeller wheel 2 is constructed to have a rotational symmetry and includes a central drive shaft 3, which is disposed vertically and which comprises at its lower end a driving pin 14 in the form of drive means, which meshes with the force-measuring device 7. The drive shaft 3 is coaxially surrounded by the bearing sleeve 4, which extends from the impeller wheel housing chamber 8 to the drive housing part 9 positioned below the impeller wheel housing. The bearing sleeve 4 is substantially constructed in a tubular shape and extends in its axial length beyond the drive shaft 3 and its lower cross-sectional surface is closed in a cylindrical manner. The drive shaft 3 is mounted rotatably in the bearing sleeve 4 by means of two axially spaced anti-friction bearings 22 in the form of radial bearings. The lower horizontal end surface of the drive shaft 3 is supported axially on a central ball bearing 23, which rests on a transverse web 25 in the bearing sleeve 4, thereby representing a largely frictionless axial bearing of the drive shaft 3.

Simultaneously, due to the arrangement of the bearings 22 and 23 it is ensured that no axial or radial disturbing forces whatsoever can act on the measuring body 7. Since the drive shaft 3 is rotatable only slightly by at most 5° in relation to the bearing sleeve 4, both the bearing friction of the radial 22 and of the axial bearing 23 are negligible. However, the radial bearings could also be designed as air bearings in order to improve the bearing friction. However, for reasons of economy, a slide bearing could also be provided which is sufficient particularly in the case of measuring devices having smaller mass flows. As long as it is permitted by the space requirement, the drive shaft 3 could also be mounted radially in a frictionless manner by means of a so-called cruciform spring element corresponding to DE 103 30 947.0.

The drive shaft 3 is protected in relation to the impeller wheel housing chamber 8 with a bearing sealing 26 against penetrating bulk material. Since the drive shaft 3 rotates only slightly in relation to the bearing sleeve 4, a permanent tight connection can be selected here. Preferably closely abutting rubber seals are used here which only have to be flexible in the rotational direction. In a simplified embodiment, it is also conceivable to fix the drive shaft 3 by means of an elastomer on the inner surface of the bearing sleeve 4 both for sealing the drive shaft against penetrating bulk material and also for the radial bearing of the drive shaft, wherein the most frictionless possible flexibility must be ensured only in the rotational direction.

The bearing sleeve 4 on its part is likewise rotatably mounted in the stationary drive housing part 9 in the radial and axial directions by means of two anti-friction bearings 21 and is sealed in a dustproof manner in relation to the impeller wheel housing chamber 8 by means of a sealing element 27. The sealing element 27 can also be integrated in the anti-friction bearing 21 or it may be constructed as an O-ring seal. Since neither the anti-friction bearing 21 nor the sealing element 27 comes into contact with the measured drive shaft 3, the friction values of the sealing element 27 are negligible in terms of measurement. As a result, the anti-friction bearing can be dimensioned such that it provides primarily a superior stiffness and the sealing effect can be dimensioned such that it provides superior sealing effect even relative to abrasive bulk material dust.

In the lower drive housing part 9, a gear wheel or a belt pulley 19 is provided as the bearing sleeve drive wheel for the common drive of the drive shaft 3 and of the bearing sleeve 4. This bearing sleeve drive wheel is arranged in an annular manner around the lower part of the bearing sleeve 4 and is permanently connected thereto. Laterally next to the bearing sleeve drive wheel 19 and in the lower drive housing part 9, the drive motor 5 is fixed to a drive wheel 28, which is located on its drive shaft and is preferably connected to the bearing sleeve drive wheel 19 by means of a toothed belt 20. However, this motor drive can also take place by means of a chain drive, flat belt drive, V-belt drive or gear wheel drive. This drive motor 5, located parallel to the bearing sleeve 4 advantageously permits a horizontal drive which helps achieve a small overall height. However, it is also conceivable to arrange the drive motor 5 directly below the bearing sleeve 4 and to connect it to the latter by means of a fixed coupling. However, the lateral arrangement permits a housing 1 in which the entrance openings 6 and the discharge openings 24 are located axially on top of one another and thus can be advantageously integrated in a straight vertical feed pipe part. An electric motor is provided as a drive motor 5, which is designed preferably as a simple asynchronous motor.

In the lower part of the bearing sleeve 4, the force-measuring device 7 is arranged which meshes with the driving pin 14. The force-measuring device 7 is designed as a force transducer or as a load cell and it transfers the drive force from the driven bearing sleeve 4 onto the drive shaft 3 and is thus arranged directly between the bearing sleeve and the drive shaft. In the exemplary embodiment, a double bending beam transducer is provided as the force-measuring device 7, which however could also be replaced by a rotationally symmetric load cell or a torque sensor. For this purpose, rotationally symmetric torque sensors having spoke-like deformation bodies are used preferably as torque sensors on which strain gauges are arranged, which can be fixed coaxially to the drive shaft 3 or along its extension between the latter and the bearing sleeve 4. Since the double bending beam 7 used is designed as a strain gauge sensor, the braking torque which is proportional to the mass flow is detected by means of a slight tangential deflection of the double bending beam, wherein measurement ranges of 0.1 to 0.5 mm on the load cell are common. Thus the drive shaft 3 rotates largely synchronously at the sleeve speed, wherein between the two a maximum rotation angle of 5° is possible. The force-measuring device 7 is preferably arranged symmetrically to the common rotation axis of the drive shaft 3 and the bearing sleeve, wherein the driving pin 14 is supported in an oscillating manner on the double bending beam.

The drive shaft 3 could also be guided at the bottom out of the bearing sleeve 4 through a borehole, wherein the force-measuring device 7 could then be accommodated in a separate sleeve part having an increased inner diameter and designed as a hollow body connected to the bearing sleeve.

Below the force-measuring device 7, a telemetric device 15 is also provided by means of which the measurement signals are transmitted in a contactless manner by the force transducer 7 to an evaluating device. For this purpose, the force transducer 7 is connected to an inductive transmitting device 16, by means of which the measurement signals are transmitted inductively to an inductive receiving device 17 arranged opposite to the transmitting device. Simultaneously, the inductive receiving device 17 serves for transmitting the supply voltage to the transmitting device 16, which serves for feeding the strain gauges in the double bending beam. The received measurement signals can then be transmitted by means of a galvanic connection or also a wireless transmission path to an evaluating device (not shown), which evaluates the measurement signals and displays them or processes them further. The transmission of the measurement signals is preferably carried out by means of a carrier frequency alternating current or also by means of an infrared transmission.

The stationary drive housing part 9 is substantially designed to be cylindrical and is installed in the stationary impeller wheel housing part 1, wherein the motor housing part is guided laterally out of the impeller housing part 1 and represents a part of the drive housing part 9. The upper side of the impeller wheel housing part 1 comprises the entrance opening 6, which contains preferably a connecting flange, which can be screwed to a feed pipe. The impeller wheel housing 1 is designed to be conical in the flow direction and is spaced apart from the drive housing part 9 to such an extent that the bulk material flowing through is conveyed vertically from the entrance opening 6 to the discharge opening 24, which is located axially thereunder and which can likewise be connected to a feed pipe. It is thus advantageously possible to provide measuring devices with heights of 250 mm and above with which feeding quantities of 20 tons per second can be measured. With measuring devices having overall heights of 900 mm and above, it is possible to realize constructions measuring feeding quantities of up to 600 tons per second.

The function of the measuring device will be explained in more detail with reference to the drawing. In an idling operation when there is no bulk material flow guided onto the impeller wheel 2 it is merely necessary to provide a drive torque or a braking torque through the bearing sleeve 4 which torque corresponds to the friction in the measuring train. Due to the fact that no friction occurs in this portion of the measuring train because the bearing sleeve 4 rotates in synchronism with the drive shaft 3, only the bearing friction, which occurs due to vibrations or small fluctuations in speed, must be applied by the bearing sleeve 4. The frictions occurring in this portion are relatively small because the drive shaft 3 moves only slightly in the bearing sleeve 4 due to such forces and there also hardly occurs any friction due to the anti-slide bearing 22. A corresponding idling torque is therefore generated basically only by air turbulences on the impeller wheel 2. This constant idling torque is compensated by taring the measuring device so that a high zero point constancy is achieved due to the almost frictionless drive shaft bearing 22.

When a bulk material flow 10 is axially admitted on the impeller wheel 2, a radial acceleration of the bulk material flow 10 occurs due to the deflection. Due to the bulk material flow, a Coriolis force generates an additional braking torque on the drive shaft 3.

This braking torque is directly proportional to the mass flow. As a result, the force-measuring device 7 that meshes with the drive shaft 3, is tangentially deflected by a maximum of 0.1 to 0.5 mm and this braking torque is transmitted from the drive shaft 3 onto the double bending beam transducer 7. Thus, the force detected by the double bending beam transducer 7 represents a value for the mass flow or bulk material flow 10 passing through the impeller wheel 2. The feed advance rate or feeding quantity of the mass flow passing through the impeller wheel 2 becomes determinable and displayable with the aid of an evaluating unit (not shown) and by means of the known geometric dimensions of the impeller wheel 2 and the length of the lever arm of the double bending beam transducer 7.

Theoretically it is assumable that at a constant drive speed of the impeller wheel 2, the required drive torque between the impeller wheel 2 and its drive is exactly proportional to the mass flow rate. In practice, however, this proportionality is influenced by additional braking torques, which occur due to friction influences in the measuring train. This problem has been solved by the measure according to the invention that all friction influences are completely eliminated in the measuring train at the drive shaft bearing and in the transition to the impeller wheel housing chamber 8. This elimination is achieved by arranging the force-measuring device 7 directly between the drive shaft 3 and the bearing sleeve 4, by means of which force-measuring device there occurs almost no relative movement between the drive shaft 3 and the bearing sleeve 4 so that the drive shaft 3 is mounted along its entire length up to the force-measuring device 7 in a frictionless manner. In this connection, it is irrelevant what type of rotational bearing 22 is provided between the drive shaft 3 and the bearing sleeve 4 so that simple bearings can also be provided. On the other hand, the invention shifts the friction influences into the area between the outer jacket of the bearing sleeve 4 and the stationary drive housing part 9. Thus, basically the drive shaft 3 is decoupled from friction influences all the way into the impeller wheel housing chamber 8 because the axial and radial bearing 21 of the sleeve 4, which bearing is subject to friction, is not arranged in the measuring train up to the force-measuring device 7. It is therefore almost impossible for friction influences at the bearing seal 26 and bulk material dust possibly entering there to be able to influence the measuring accuracy. Therefore, temperature fluctuations occurring in this area in the bulk material are basically negligible for the measuring accuracy because although this causes the bearing friction between the bearing sleeve 4 and the drive housing part 9 to fluctuate, this variation does not influence the detectable drive torque, which acts on the double bending beam transducer 7 in the measuring train. Thus, it is advantageously possible to provide sealing elements 27 that are subject to friction at the bearing 21 between the bearing sleeve 4 and the drive housing part 9. Such sealing elements ensure a permanent sealing for bulk materials having strongly abrasive dust components.

The frictionless drive shaft bearing of the invention and simultaneously its arrangement ensure that no axial or radial disturbing forces whatsoever act on the measuring body. The frictionless drive shaft bearing of the invention also particularly improves the measuring accuracy for small mass flows 10 since the then necessary relatively high impeller wheel speeds tend to cause relatively strong imbalances even in the case of smaller fluctuations in the bulk flow and uneven impeller wheel loadings. These strong imbalances cannot become effective in the measuring train. Furthermore, such a frictionless bearing of the measuring train permits a relatively small diameter of the bearing sleeve drive wheel 19 in relation to the diameter of the impeller wheel. The small diameter of the bearing sleeve drive wheel permits the achievement of a higher measurement signal sensitivity because braking torque fluctuations that are subject to friction are minimized in the measuring train. As a result, a high zero point constancy is ensured even for small bulk material flows 10.

The invention claimed is:

1. Device for measuring the mass flow, particularly of a bulk material flow, in accordance with the Coriolis measuring principle, which device comprises an impeller wheel (2), which is driven by a motor (5) at constant speed and onto which the material flow (10) is dispensed and deflected radially and the drive torque is measured by means of a force-measuring device (7), wherein a drive shaft (3), which supports the impeller wheel (2), is mounted rotatably in a bearing sleeve (4) and is enclosed coaxially by the same and protrudes into the impeller wheel housing chamber (8), wherein the bearing sleeve (4) is mounted rotatably in a stationary drive housing part (9) and is driven at a speed, which corresponds to that of the drive shaft (3), said device being characterized in that the force-measuring device (7) is disposed between the drive shaft (3) and the bearing sleeve (4), wherein a force-receiving part (13) of the force-measuring device (7) is fixed to a part disposed in an interior zone (11) of the bearing sleeve (4) and that the drive shaft (3) is supported on a force-inducing part (12) by means of a drive means (14) spaced apart from the rotation point and the drive torque between the bearing sleeve (4) and the drive shaft (3) is detected.

2. Device for measuring a mass flow according to claim 1, characterized in that the force-measuring device (7) is disposed inside the bearing sleeve (4) or inside a hollow body connected to the bearing sleeve (4).

3. Device for measuring a mass flow according to claim 1, characterized in that the force-measuring device (7) is designed as a bending beam transducer, as a load cell of rotational symmetry or as a torque sensor.

4. Device for measuring a mass flow according to claim 1, characterized in that the force-measuring device (7) is disposed in such a way between the drive shaft (3) and the bearing sleeve (4) that it (7) detects the drive torque applied by the bearing sleeve (4).

5. Device for measuring a mass flow according to claim 1, characterized in that the force-measuring device (7) is connected to a telemetric device (15) which comprises a transmitting device (16) disposed on the bearing sleeve (4) and a receiving device (17) disposed on the stationary drive housing part (9), by means of which (16, 17) at least the detected measurement signals can be transmitted.

6. Device for measuring a mass flow according to claim 5, characterized in that the transmitting device (16) and the receiving device (17) contain inductors, which are disposed in such a way relative to one another that it is possible to transmit both the measurement signals as well as the supply voltage for the force-measuring device (7) by means of the inductive coupling of said inductors.

7. Device for measuring a mass flow according to claim 1, characterized in that the bearing sleeve (4) is connected to a motor (5) by means of a driving device (19, 20, 28), wherein the motor (5) is disposed sideways next to or directly below the bearing sleeve (4).

8. Device for measuring a mass flow according to claim 7, characterized in that the driving device (19, 20, 28) comprises a drive wheel (19), which is fixed on the bearing sleeve (4) and which is connected by means of a belt drive (20), chain drive or a gear wheel drive to the laterally disposed electric motor (5), which serves for driving the impeller wheel (2).

9. Device for measuring a mass flow according to claim 1, characterized in that the bearing sleeve (4) is mounted rotatably in the stationary drive housing part (9) and protrudes into the impeller wheel housing (8) and rotates synchronously at the constant speed of the impeller wheel.

10. Device for measuring a mass flow according to claim 9, characterized in that the bearing sleeve (4) is mounted radially and axially in the drive housing part (9) by means of bearings, particularly by means of ball bearings or taper roller bearing (21).

11. Device for measuring a mass flow according to claim 10, characterized in that the drive shaft (3) is mounted by means of a radial bearing (22), particularly by means of a slide bearing, ball bearing, air bearing or a cruciform spring element in relation to the bearing sleeve (4).

12. Device for measuring a mass flow according to claim 11, characterized in that the drive shaft (3) is mounted axially in relation to the bearing sleeve (4) by means of a central axial bearing (23), particularly by means of a ball bearing or a conical bearing.

13. Device for measuring a mass flow according to claim 1, characterized in that the drive shaft (3) supporting the impeller wheel (2) is mounted rotatably in the bearing sleeve (4), wherein the drive shaft (3) is supported in drive terms on a force-measuring device (7) in such a way that the drive shaft (3) rotates at the same speed by means of the driven bearing sleeve (4).

14. Device for measuring a mass flow according to claim 1, characterized in that the stationary drive housing part (9) is designed to be cylindrical in the axial direction and is surrounded by a downwardly conically tapering impeller housing (1) and comprises entrance openings (6) and discharge openings (24), which are located axially on top of each other in the straight direction of the flow, wherein the drive motor (5) is disposed sideways next to the drive housing part (9) outside of the impeller wheel housing (1) and thus has a flat construction.

15. Device for measuring a mass flow according to claim 1, characterized in that the force-measuring device (7) is connected to an evaluating device, which calculates the feed advance rate and/or the feeding quantity of the mass flow from the detected measurement signals, the geometric dimensions and other physical parameters.

16. A device for measuring the mass flow rate of a bulk material flow, said device comprising an impeller wheel within an impeller wheel housing and upon which material flow is received and deflected radially,

- a drive shaft supporting said impeller wheel and rotatably mounted within, and coaxially enclosed by, a bearing sleeve,
- a motor for driving said drive shaft and impeller at a constant speed,
- a stationary drive housing, said bearing sleeve rotatably mounted within said stationary drive housing, wherein said bearing sleeve is driven at a speed corresponding to the speed of said drive shaft, and
- a force-measuring device disposed between said drive shaft and said bearing sleeve for detecting a drive torque, said force measuring device including a force-receiving portion fixed to said bearing sleeve and a force-inducing portion connected to said drive shaft through a drive means that is spaced radially from the drive shaft, wherein said force-measuring device detects the drive torque between said drive shaft and said bearing sleeve.

* * * * *